United States Patent
Wang et al.

(10) Patent No.: US 8,180,378 B2
(45) Date of Patent: May 15, 2012

(54) ACCESS PROBE ENHANCEMENTS

(75) Inventors: Shu Wang, San Diego, CA (US);
Jungwon Min, San Diego, CA (US);
Li-Hsiang Sun, San Diego, CA (US)

(73) Assignee: LG Electronics Inc., Seoul (KR)

( * ) Notice: Subject to any disclaimer, the term of this patent is extended or adjusted under 35 U.S.C. 154(b) by 574 days.

(21) Appl. No.: 12/464,789

(22) Filed: May 12, 2009

(65) Prior Publication Data

US 2009/0280828 A1 Nov. 12, 2009

Related U.S. Application Data

(60) Provisional application No. 61/091,718, filed on Aug. 25, 2008, provisional application No. 61/052,583, filed on May 12, 2008.

(51) Int. Cl.
*H04W 72/00* (2009.01)

(52) U.S. Cl. ............... 455/456.5; 455/456.1; 455/456.2; 455/456.3; 455/458

(58) Field of Classification Search ........ 455/456.1–458
See application file for complete search history.

(56) References Cited

U.S. PATENT DOCUMENTS

| | | | | |
|---|---|---|---|---|
| 6,438,380 B1 * | 8/2002 | Bi et al. | ..................... | 455/456.1 |
| 6,442,152 B1 * | 8/2002 | Park et al. | ..................... | 370/341 |

\* cited by examiner

*Primary Examiner* — Olumide T Ajibade Akonai
*Assistant Examiner* — Jamie Holliday
(74) *Attorney, Agent, or Firm* — Lee, Hong, Degerman, Kang & Waimey

(57) ABSTRACT

A method of providing a location based service to an access terminal in a mobile communication system is provided. The method includes transmitting one or more access probes, each of the one or more access probes including a preamble having a first specific length and transmitted at a first power level, where the preamble is utilized to determine a position of the access terminal.

46 Claims, 14 Drawing Sheets

ACCESS PROBE ENHANCEMENTS

CROSS-REFERENCE TO RELATED APPLICATIONS

Pursuant to 35 U.S.C. §119, this application claims the benefit of U.S. Provisional Application Ser. No. 61/091,718 filed on Aug. 25, 2008, and 61/052,583 filed on May 12, 2008, the contents of which are hereby incorporated by reference herein in their entirety.

FIELD OF THE INVENTION

The present invention relates to mobile communication systems, and particularly, to enhanced access probes used in mobile communication systems.

DESCRIPTION OF THE RELATED ART

The demand for location-based services (LBSs), which utilize the location information of an access terminal to provide personalized information and services, is rapidly increasing among consumers of access terminals. An access terminal can be any mobile communication device, such as a cellular telephone.

When providing LBSs, the position information of the access terminal may need to be determined with an appropriate level of accuracy, depending on the type of LBSs and applications with which the position information is to be used. For example, as shown in FIG. 1, the accuracy of the position information required by various LBSs and applications can be divided into three service levels, such as a basic service level 102, an enhanced service level 104, and an extended service level 106.

For example, the accuracy provided by the basic service level 102 may be within approximately 400 meters (m) to 1500 m, the accuracy provided by the enhanced service level 104 may be within approximately 40 m to 150 m, and the accuracy provided by the extended service level 106 may be less than approximately 40 m.

For example, LBSs and applications, such as "Local Weather" 105 and "Local News" 107, require the accuracy provided by the basic service level 102, whereas the "Safety and Emergency Service" 109 requires the accuracy provided by the extended service level 106.

The position information used by the LBSs and applications can be determined using various positioning technologies.

For example, an access terminal can use mobile-based positing technologies where the position information is determined by the access terminal and transmitted to the network. Examples of such mobile-based positing technologies include cell identification (Cell ID), timing advance, time of arrival, received signal strength level, Global Positioning System (GPS), and Assisted Global Positioning System (A-GPS).

As another example, the position of an access terminal can be determined using network based technologies where the position information is determined by the mobile communication network. Examples of such network-based technologies include Uplink Time Difference of Arrival (U-TDOA) and Angle of Arrival (AOA).

As still another example, the position of an access terminal can be determined using mobile-assisted technologies where the access terminal performs the timing measurements and transmits the timing measurements to a serving mobile location center node that performs the appropriate calculations to determine the position information. Examples of such mobile assisted technologies include Enhanced Observed Time Difference (EOTD), Observed Time Difference of Arrival (OT-DOA), Enhanced Forward Link Trilateration (EFLT), Advanced Forward Link Trilateration (AFLT), and Assisted Global Positioning System (A-GPS).

Currently, there are two types of architectures for providing location services (LCS) which determine the position of an access terminal. These architectures are control-plane architecture and user-plane architecture.

An exemplary implementation of a 3rd Generation Partnership Project 2 (3GPP2) location services (LCS) control-plane architecture is shown in FIG. 2. As shown in FIG. 2, the 3GPP2 LCS control-plane architecture 200 includes mobile switching centers (MSCs) 208a and 208b, a visitor location register (VLR) 210, a home location register (HLR) 212, a mobile positioning center (MPC) 214, a position determining entity (PDE) 216, a serving node (SN) 218, a service control point (SCP) 220, and a location services (LCS) client 222.

The control-plane architecture 200 provides a high level of accuracy and wide availability as required by the Enhanced 911 (E911) mandate. In the control-plane architecture, positioning information is transmitted via control channels.

An exemplary implementation of a 3GPP2 LCS user-plane architecture is shown in FIG. 3. As shown in FIG. 3, the 3GPP2 LCS user-plane architecture 300 includes a home position server 324, network LCS clients 326a and 326b, an external LCS client 328, a serving position server 330, one or more PDEs 332, a server 334, an access terminal (AT) 336, an LCS client 338, a wireless network operator (WNO), IP networks 340a and 340b, an Internet 342, and a packet data serving node (PDSN) 344.

In the user-plane architecture 300, LCS associated communications between an access terminal and a mobile communication network are transmitted as user data using the Internet Protocol (IP). Thus, the user-plane architecture 300 is an alternative implementation to existing 3GPP and 3GPP2 control-plane architectures.

The positioning technologies used in CDMA2000 networks will now be discussed. Examples of positioning technologies used in CDMA2000 networks include Enhanced Forward Link Trilateration (EFLT), Advanced Forward Link Trilateration (AFLT), and Assisted Global Positioning System (A-GPS).

In EFLT, the position of an access terminal is determined using an existing pilot signal measurement message (PSMM) transmitted by the access terminal to a base transceiver station (BTS). For example, the BTS can provide the PSMM to the MSC, which can then provide the PSMM to the PDE. The PDE then determines the position of the access terminal using techniques known in the art. EFLT supports legacy access terminals with up to approximately 1 chip resolution. As such, EFLT is typically used as an alternative positioning technology for use with access terminals which cannot support AFLT or A-GPS.

AFLT is a TDOA-based technique which requires synchronization of the base station transceivers (BTSs) across the entire network and also requires the access terminals to have precise timing. In AFLT, the access terminal must receive sufficiently strong signals from 3 or more BTSs to enable determination of the position of the access terminal via triangulation. The position information acquired by the access terminal is transmitted to a PDE using, for example, IS-801 message protocols. AFLT has an approximately ⅛ chip resolution reporting and is commonly used as a hybrid with A-GPS.

In A-GPS, an access terminal acquires data via a GPS receiver and transmits the acquired data using, for example, IS-801 message protocols to a PDE in the network. Thus, in A-GPS, the network assists the access terminal by performing the appropriate calculations using the acquired data to determine the position of the access terminal.

Thus, the EFLT and AFLT positioning technologies are exclusive to CDMA networks and require assistance from the access terminal. For example, the access terminal is required to measure the forward link pilots from multiple BTSs. However, as described below, there are important tradeoffs between forward link positioning techniques and reverse link positioning techniques.

Although a number of access terminal assisted positioning technologies have been developed for the CDMA2000 standard, such positioning technologies rely on the forward link. With forward link techniques, the access terminals are generally required to perform at least a portion of the positioning calculations and other resource consuming procedures. However, although the power of the forward link pilot channels is strong, access terminals typically have limited power, processing, and communication resources. Moreover, forward link techniques are not supported by the Evolution, Data Only (EV-DO) standard.

With reverse link techniques, no feedback channel is required and the BTSs and other network components generally have adequate resources for determining the position of the access terminal, thereby imposing less of a burden on the access terminal relative to the forward link techniques. Moreover, the ability to use reverse link techniques is not dependent on the telecommunication standard that governs the communications.

As discussed above, various LBSs have various accuracy and cost requirements. Consequently, enhancements to reverse link positioning techniques, such as reverse link Time of Arrival/Time Difference of Arrival (TOA/TDOA), are needed to satisfy such accuracy and cost requirements and to increase the effectiveness and usage of LBSs. An exemplary reverse link TOA/TDOA positioning system is shown in FIG. 4.

The reverse link TOA/TDOA positing system 400 in FIG. 4 includes an access terminal 336, a first base transceiver station (BTS1) 348, a second base transceiver station (BTS2) 350, a location measurement unit (LMU) 352, and an access burst indicated by arrows 354a, 354b, and 354c.

In a reverse link TOA technique implemented by the system 400, the first BTS1 348, second BTS2 350 and the LMU 352 each measure the time of arrival of an access burst, such as the access burst indicated by arrows 354a, 354b, and 354c, transmitted on an access channel by the access terminal 336.

For example, the access terminal 336 can be configured to randomly transmit such access bursts. When determining position via TOA, a single TOA measurement by either a BTS, such as first BTS1 348, or an LMU, such as LMU 352, determines a circle, such as circle 356. The position estimation schemes are similar to those of the AFLT technique used in the CDMA2000 standard.

In a reverse link TDOA technique implemented by system 400, the first BTS 1 348, second BTS2 350, and the LMU 352 each measure the time of arrival (TOA) of an access burst, such as the access burst indicated by arrows 354a, 354b, and 354c, transmitted on an access channel by the access terminal 346. In the TDOA approach, the difference in TOA measurements between one BTS or LMU and another BTS or LMU determines a hyperbola, such as hyperbola 358 indicated by the dotted line in FIG. 4. The position estimation schemes are similar to those of the AFLT technique used in the CDMA2000 standard.

In the EV-DO standard, an access terminal initiates communications with a BTS or responds to a BTS by transmitting access probes on an access channel. The access channel typically is a pilot channel and a data channel. An access probe typically includes a preamble and one or more access channel physical layer packets. The access terminal transmits a series of access probes until a response is received from a BTS or until a predetermined period of time elapses. Exemplary EV-DO access probes are shown in FIGS. 5 and 6.

FIGS. 5 and 6 each show an access probe with a transmission rate of 9.6 kbps. The access probe 559 in FIG. 5 is a physical layer protocol Subtype 0 and the access probe 661 shown in FIG. 6 is a physical layer protocol Subtype 1. To transmit only a preamble, only the pilot channel is used. However, to transmit a physical layer packet, both the pilot and data channels are used. For example, the default data rate of the access channel is 9.6 kbps and the access channel can be configured to support higher data rates of 19.2 kbps and 38.4 kbps in physical layer protocol Subtypes 1 and 2.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect of the invention, a method of providing a location based service to an access terminal in a mobile communication system is provided. The method includes transmitting one or more access probes, each of the one or more access probes including a preamble having a first specific length and transmitted at a first power level, wherein the preamble is utilized to determine a position of the access terminal.

It is contemplated that the method further includes receiving at least one access parameter defining at least the first specific length or the first power level.

It is contemplated that the at least first specific length or first power level are defined according to at least one intended recipient. It is further contemplated that the at least one access parameter further indicates at least one access offset value and transmitting the one or more access probes includes delaying the transmission according to the at least one access offset value.

It is contemplated that the method further includes receiving an acknowledgment of the receipt of the one or more access probes from at least one intended recipient, the acknowledgment including an indication of a preamble-only access mode and transmitting one or more additional access probes, each of the one or more additional access probes having a second specific length and transmitted at a second power level.

It is contemplated that the method further includes receiving at least one access parameter defining at least the second specific length or the second power level. It is further contemplated that the at least one access parameter indicates at least one access offset value and transmitting the one or more additional access probes includes delaying the transmission according to the at least one access offset value.

It is contemplated that transmitting the one or more additional access probes includes transmitting a first of the one or more additional access probes having the second specific length at the second power level and transmitting a second of the one or more additional access probes having a third specific length at a third power level, wherein at least the second specific length and the third specific length are different or the second power level and the third power level are different.

It is contemplated that the second specific length and the second power level are set according to a strength of a signal received from a first of the at least one intended recipient and the third specific length and the third power level are set according to a strength of a signal received from a second of the at least one intended recipient.

It is contemplated that transmitting the one or more additional access probes includes transmitting a first of the one or more additional access probes according to a first offset and transmitting a second of the one or more additional access according to a second offset, wherein the first offset and the second offset are different.

It is contemplated that the second power level and the first power level are the same. It is further contemplated that the second power level and the first power level are different.

It is contemplated that the second specific length and the first specific length are the same. It is further contemplated that the second specific length and the first specific length are different.

It is contemplated that each of the one or more additional access probes includes only a preamble.

It is further contemplated that the method further includes receiving at least one access parameter defining at least the second specific length or the second power level. It is further contemplated that the at least one access parameter indicates at least one access offset value and transmitting the one or more additional access probes includes delaying the transmission according to the at least one access offset value.

It is contemplated that transmitting the one or more additional access probes includes transmitting a first of the one or more access probes having the first specific length at the first power level and transmitting a second of the one or more additional access probes having a second specific length at a second power level, wherein at least the first specific length and the second specific length are different or the first power level and the second power level are different.

It is contemplated that the second specific length and the second power level are set according to a strength of a signal received from a first intended recipient and the third specific length and the third power level are set according to a strength of a signal received from a second intended recipient.

It is contemplated that transmitting the one or more additional access probes includes transmitting a first of the one or more additional access probes according to a first offset and transmitting a second of the one or more additional access according to a second offset, wherein the first offset and the second offset are different.

It is contemplated that the second power level and the first power level are the same. It is further contemplated that the second power level and the first power level are different.

It is contemplated that the second specific length and the first specific length are the same. It is further contemplated that the one or more access probes are transmitted upon receiving a paging message from a network.

It is contemplated that each of the one or more access probes further includes data having a second specific length and transmitted at a second power level. It is further contemplated that the first specific length and the second specific length are determined according to at least one intended recipient.

It is contemplated that the first power level and the second power level are determined according to at least one intended recipient. It is further contemplated that each of the one or more access probes includes only a preamble.

In one aspect of the invention, a method of providing a location based service to an access terminal in a mobile communication system is provided. The method includes receiving one or more access probes from an access terminal, each of the one or more access probes including a preamble having a first specific length and transmitted at a first power level and utilizing the preamble to determine a position of the access terminal.

It is contemplated that the method further includes transmitting at least one access parameter defining at least the first specific length or the first power level. It is further contemplated that the at least first specific length or first power level are defined according to at least one intended recipient of the one or more access probes.

It is contemplated that the at least one access parameter further indicates at least one access offset value for transmitting the one or more additional access probes.

It is contemplated that the method further includes transmitting an acknowledgment of the receipt of the one or more access probes, and receiving one or more additional access probes, each of the one or more additional access probes having a second specific length and transmitted at a second power level.

It is contemplated that the method further includes transmitting at least one access parameter defining at least the second specific length or the second power level. It is further contemplated that the at least one access parameter indicates at least one access offset value for transmitting the one or more additional access probes.

It is contemplated that at least the specific length of a first of the one or more additional access probes is different than a specific length of a second of the one or more additional access probes or a power level of the first of the one or more additional access probes is different than a power level of the second of the one or more additional access probes.

It is contemplated that the second power level and the first power level are the same. It is further contemplated that the second power level and the first power level are different.

It is contemplated that the second specific length and the first specific length are the same. It is further contemplated that the second specific length and the first specific length are different. It is contemplated that each of the one or more additional access probes including only a preamble.

It is contemplated that the method further includes transmitting at least one access parameter defining at least the second specific length or the second power level. It is further contemplated that the at least one access parameter indicates at least one access offset value for transmitting the one or more additional access probes.

It is contemplated that at least the specific length of a first of the one or more additional access probes is different than a specific length of a second of the one or more additional access probes or a power level of the first of the one or more additional access probes is different than a power level of the second of the one or more additional access probes.

It is contemplated that the second power level and the first power level are the same. It is further contemplated that the second power level and the first power level are different.

It is contemplated that the second specific length and the first specific length are the same. It is further contemplated that the second specific length and the first specific length are different.

It is contemplated that each of the one or more access probes further includes data having a second specific length and transmitted at a second power level. It is further contemplated that each of the one or more access probes includes only a preamble.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to an apparatus and method for providing a location based service (LBS) to an access terminal in a mobile communication system. Reference will now be made in detail to the preferred embodiments of the present invention, examples of which are illustrated in the accompanying drawings.

Figure 7:
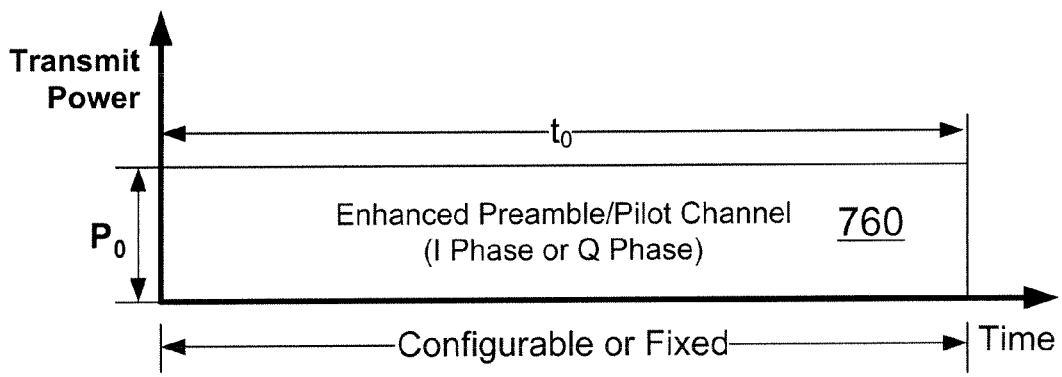
FIG. 7 shows an exemplary preamble only access probe in accordance with one embodiment of the present invention.

FIG. 7 shows an exemplary preamble only access probe in accordance with one embodiment of the present invention.

As shown in FIG. 7, the preamble only access probe 760 includes an enhanced preamble and does not contain data. For example, the enhanced preamble can be transmitted via the pilot channel on the in-phase ("I-phase") or the quadrature-phase ("Q-phase"). In one embodiment, the transmit power $P_O$, that is, the output power, of the preamble is configurable and the default value is equivalent to the transmit power used for transmitting data at 9.6 kbps in accordance with EV-DO standards.

The length of the preamble can be defined by an extended access parameter message, such as "PreambleLengthEx" that indicates a number of frames. For example, the length of the preamble can be indicated as four slots if the value of the "PreambleLengthEx" parameter is 0. Otherwise, the length of the preamble can be indicated as the number of frames based on the value of the "PreambleLengthEx" parameter.

Table 1 shows an exemplary access parameter message structure in accordance with the present invention.

TABLE 1

| Field | Length (bits) |
| --- | --- |
| Message ID | 8 |
| AccessCycleDuration | 8 |
| AccessSignature | 16 |
| OpenLoopAdjust | 8 |
| ProbeInitialAdjustEACMAC | 5 |
| ProbeNumStep | 4 |
| PowerStep | 4 |
| PreambleLength | 3 |
| CapsuleLengthMax | 4 |
| $N_{ACMPAPersist}$ occurrences of the following field: | |
| APersistence | 6 |
| EnhancedAccessParametersIncluded | 0 or 1 |
| PreambleLengthSlots | 0 or 1 |
| AccessOffset | 0 or 2 |
| SectorAccessMaxRate | 0 or 2 |
| ProbeTimeOutAdjust | 0 or 3 |
| PilotStrengthNominal | 0 or 3 |
| PilotStrengthCorrectionMin | 0 or 3 |
| PilotStrengthCorrectionMax | 0 or 3 |
| ExtendedAccessParametersIncluded | 0 or 1 |
| PreambleOnlyEnabledEx | 0 or 1 |
| PreambleLengthEx | 0 or 4 |
| AccessOffsetEx | 0 or 3 |
| ProbeTimeOutAdjustEx | 0 or 3 |

TABLE 1-continued

| Field | Length (bits) |
|---|---|
| PilotStrengthNominalEx | 0 or 3 |
| PilotStrengthCorrectionMinEx | 0 or 3 |
| PilotStrengthCorrectionMaxEx | 0 or 3 |
| Reserved | variable |

As shown in Table 1, the access parameter message structure includes various fields for controlling the access channel, with each field having a corresponding bit length. For example, with respect to the embodiment of FIG. 7, a BTS can communicate to an access terminal that the BTS is capable of receiving a preamble only access probe using the "PreambleOnlyEnabledEx" field shown in Table 1.

Figure 8:
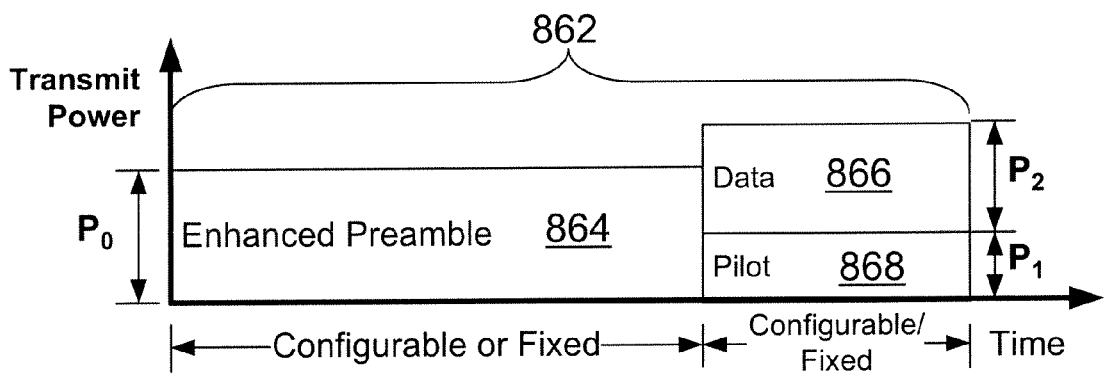
FIG. 8 shows an exemplary extended access probe with a payload in accordance with one embodiment of the present invention.

FIG. 8 shows an exemplary extended access probe with a payload in accordance with one embodiment of the present invention. As shown in FIG. 8, the extended access probe 862 includes the enhanced preamble 864, probe data 866, and the pilot signal 868. For example, the enhanced preamble 864 can be transmitted via the pilot channel on the I-phase or the Q-phase with transmit power $P_0$. The first "PreambleLengthEx" frame of the pilot, on either the I-phase or the Q-phase, functions as a preamble, such as enhanced preamble 864.

As also shown in FIG. 8, the probe data 866 can be transmitted with transmit power $P_2$ following the enhanced preamble 864 in accordance with the "CapsuleLengthMax" field via a phase component (I-phase or Q-phase) that is different from the phase component of the pilot 868. As shown in FIG. 8, pilot 868 can be transmitted with transmit power $P_1$. In one embodiment, the transmit power $P_0$, that is, the output power, of the enhanced preamble 864 is configurable and the default value is equivalent to the transmit power used for transmitting data at 9.6 kbps in accordance with EV-DO standards.

For example, with respect to the embodiment of FIG. 8, an access terminal can communicate to a BTS that the access terminal will transmit a preamble only access probe using the "PreambleOnlyEnabled" field shown in Table 1.

The "PreambleOnlyEnabledEx" field in Table 1 will now be discussed. A default access probe generally includes a preamble having a maximum of 7 frames and a payload having a maximum of 15 frames. An enhanced access probe generally includes a preamble having 4 or 16 slots and a payload having a maximum of 15 frames.

Figure 1:
FIG. 1 shows a diagram illustrating the accuracy of the location information required by various location-based services and applications.
Figure 2:
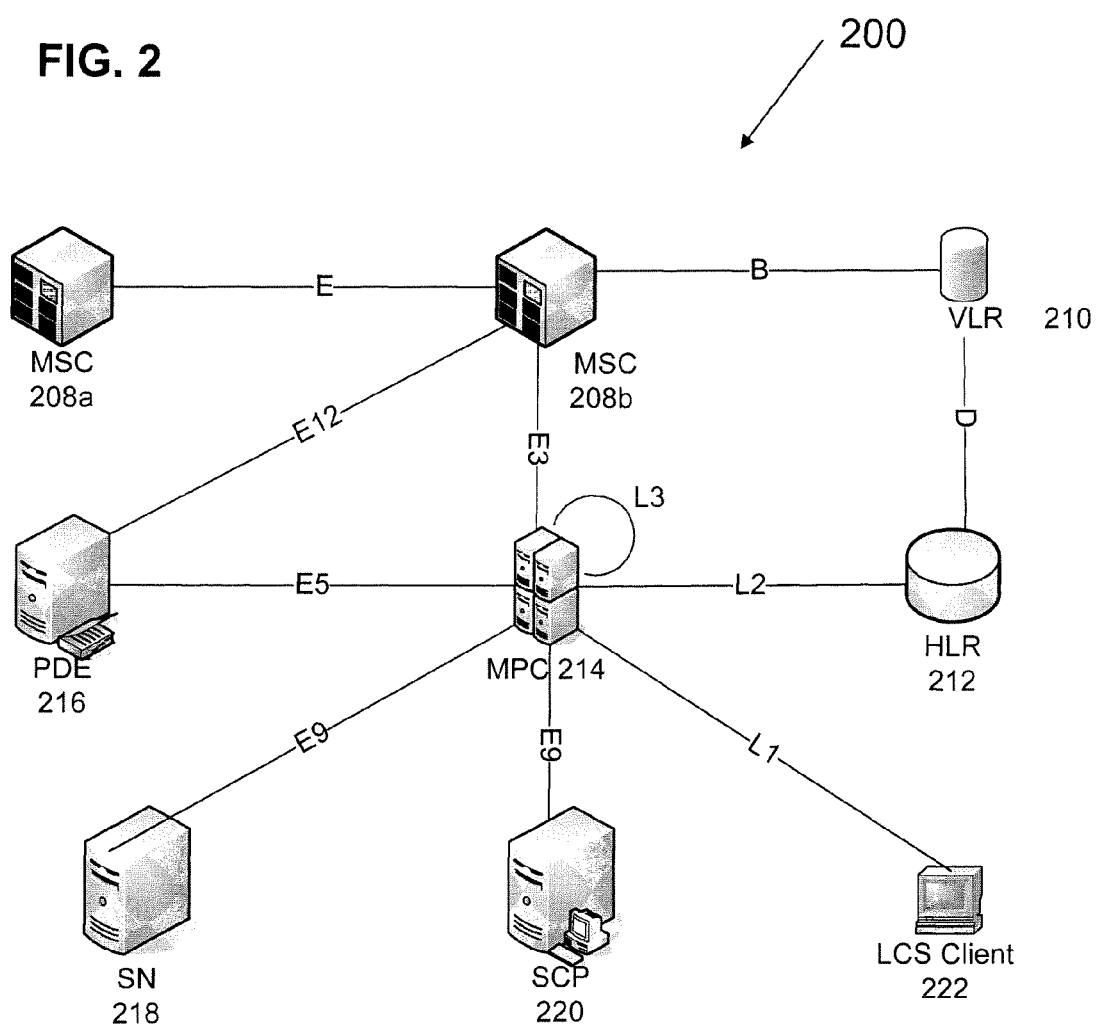
FIG. 2 shows an exemplary implementation of a 3rd Generation Partnership Project 2 (3GPP2) location services (LCS) control-plane architecture.
Figure 3:
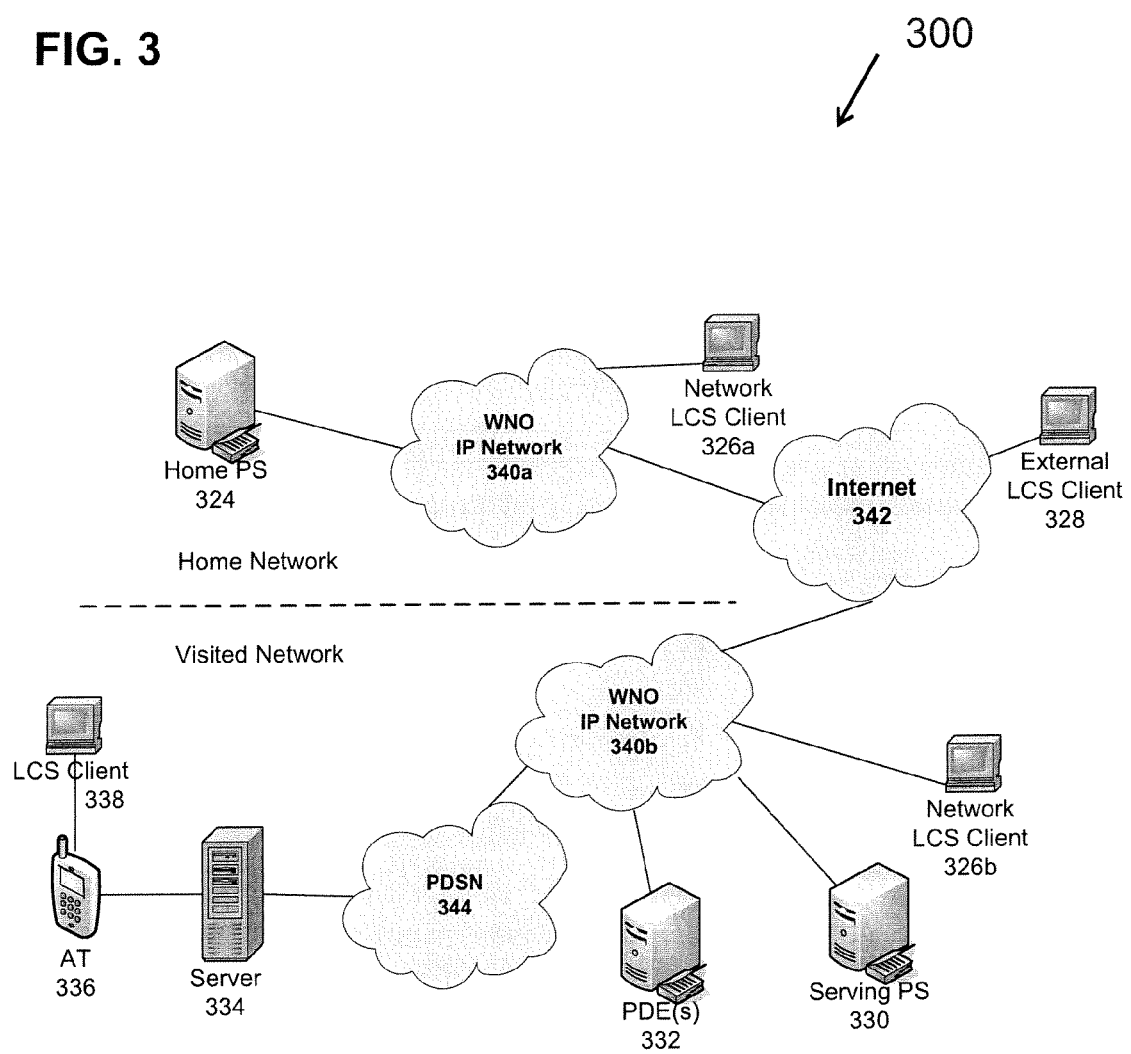
FIG. 3 shows an exemplary implementation of a 3GPP2 LCS user-plane architecture.
Figure 4:
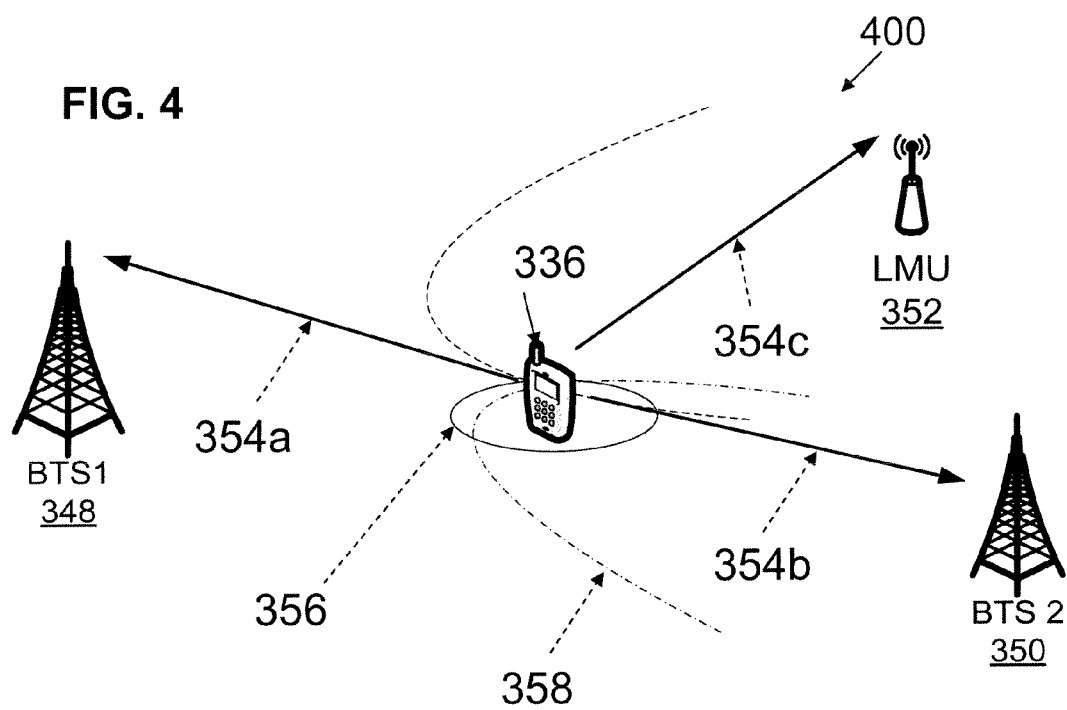
FIG. 4 shows an exemplary reverse link Time of Arrival/Time Difference of Arrival (TOA/TDOA) positioning system.
Figure 5:
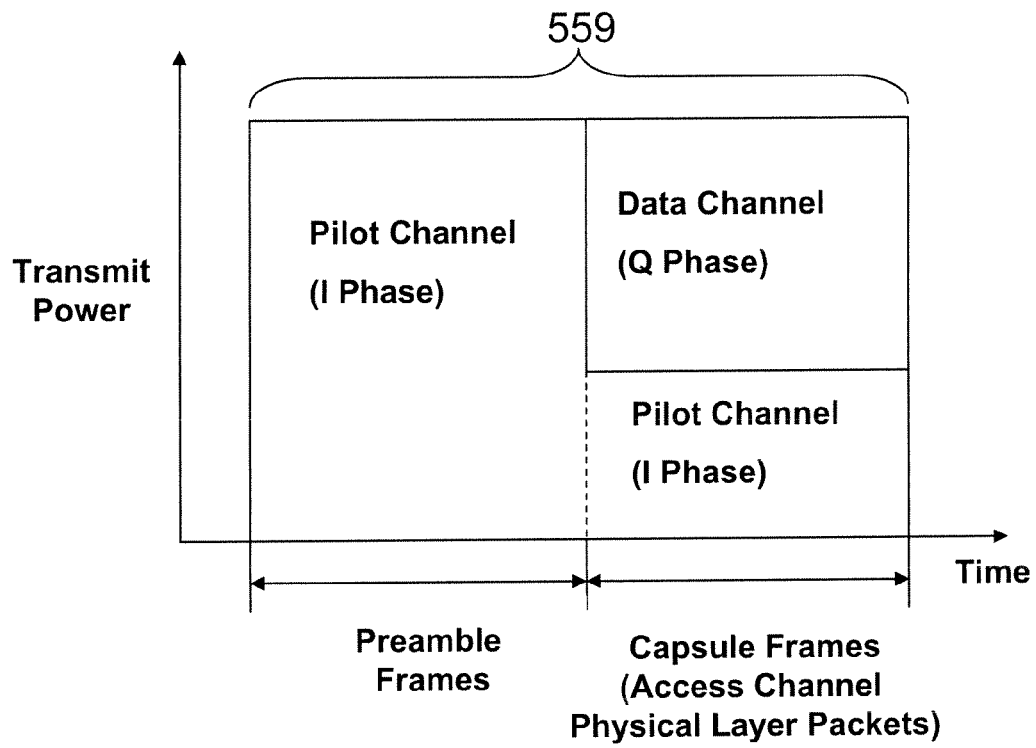
FIG. 5 shows an embodiment of an access probe with a transmission rate of 9.6 kbps.
Figure 6:
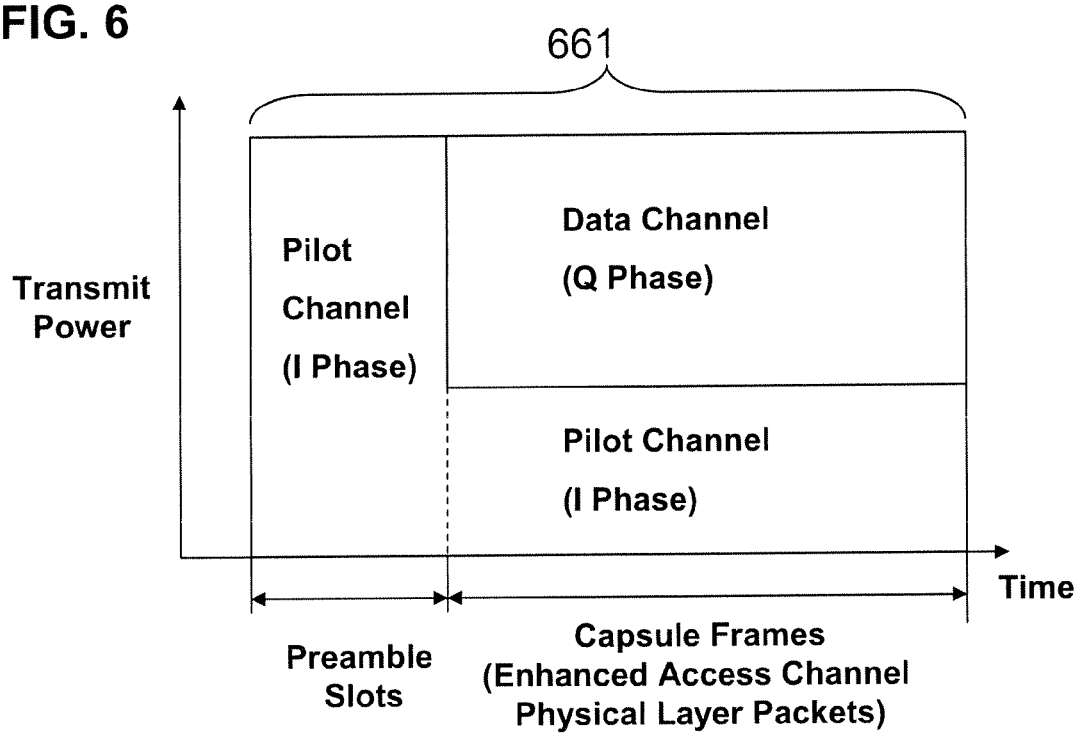
FIG. 6 shows another embodiment of an access probe with a transmission rate of 9.6 kbps.

If the "EnhancedAccessParametersincluded" field is disabled and the "PreambleOnlyEnabledEx" field is set to "1," then the preamble only access probe 760 shown in FIG. 6 can include between 2 and 22 frames. If both the "EnhancedAccessParametersIncluded" and the "PreambleOnlyEnabledEx" fields are set to "1," then the preamble only access probe 760 can include 20 slots or between 2 to 16 frames.

The "AccessOffset" and the "AccessOffsetEx" fields in Table 1 will now be discussed. As shown in Table 1, the "AccessOffset" field has a length of two bits. The BTS will set the "AccessOffset" field to indicate the slot relative to the beginning of the "AccessCycleDuration" field when the access terminal may transmit an access probe according to the "AccessOffset" encoding table. For example, the possible access probe offset values include: 0 slot, 4 slots, 8 slots or 12 slots.

The "AccessOffsetEx" field indicates the extended access probe offset and has a length of three bits. For example, as shown in Table 2, the possible access probe offset values include: 16 slots, 32 slots, 48 slots, 64 slots, 80 slots, 96 slots, 112 slots, and 128 slots.

TABLE 2

| Field Value (binary) | Definition |
|---|---|
| '000' | 16 slots |
| '001' | 32 slots |
| '010' | 48 slots |
| '011' | 64 slots |
| '100' | 80 slots |
| '101' | 96 slots |
| '110' | 112 slots |
| '111' | 128 slots |

The "ProbeTimeOutAdjustEx" field in Table 1 will now be discussed. If the "ExtendedAccessParametersIncluded" field is not included in this message, or if the "ExtendedAccessParametersIncluded" field is included and is equal to '0,' then the access network can be configured to omit the "ProbeTimeOutAdjustEx" field. Otherwise, the access network can be configured to set the "ProbeTimeOutAdjustEx" field in slots according to Table 3.

TABLE 3

| Field Value (binary) | Definition |
|---|---|
| '000' | 0 slots |
| '001' | 16 slots |
| '010' | 32 slots |
| '011' | 48 slots |
| '100' | 64 slots |
| '101' | 80 slots |
| '110' | 96 slots |
| '111' | 112 slots |

The "PilotStrengthNominal" field in Table 1 will now be discussed. If the "ExtendedAccessParametersIncluded" field is not included in this message, or if the "ExtendedAccessParametersIncluded" field is included and is equal to '0,' then the access network can be configured to omit the "PilotStrengthNominal" field. Otherwise, the access network can be configured to set "PilotStrengthNominal" field according to Table 4.

TABLE 4

| Field Value (binary) | Definition |
|---|---|
| '000' | 0 db |
| '001' | −1 db |
| '010' | −2 db |
| '011' | −3 db |
| '100' | 1 db |
| '101' | 2 db |
| '110' | 3 db |
| '111' | 4 db |

The "PilotStrengthCorrectionMin" field in Table 1 will now be discussed. If the "ExtendedAccessParametersIncluded" field is not included in this message, or if the "ExtendedAccessParametersIncluded" field is included and is equal to '0,' then the access network can be configured to omit the "PilotStrengthCorrectionMin" field. Otherwise, the access network can be configured to set the "PilotStrengthCorrectionMin" field according to Table 5.

TABLE 5

| Field Value (binary) | Definition |
| --- | --- |
| '000' | 0 db |
| '001' | −1 db |
| '010' | −2 db |
| '011' | −3 db |
| '100' | −4 db |
| '101' | −5 db |
| '110' | Reserved |
| '111' | Reserved |

The "PilotStrengthCorrectionMax" field in Table 1 will now be discussed. If the "ExtendedAccessParametersIncluded" field is not included in this message, or if "ExtendedAccessParametersIncluded" field is included and is equal to '0,' then the access network can be configured to omit the "PilotStrengthCorrectionMax" field. Otherwise, the access network can be configured to set the "PilotStrengthCorrectionMax" field according to Table 6.

TABLE 6

| Field Value (binary) | Definition |
| --- | --- |
| '000' | 0 db |
| '001' | 1 db |
| '010' | 2 db |
| '011' | 3 db |
| '100' | 4 db |
| '101' | 5 db |
| '110' | Reserved |
| '111' | Reserved |

Figure 9:
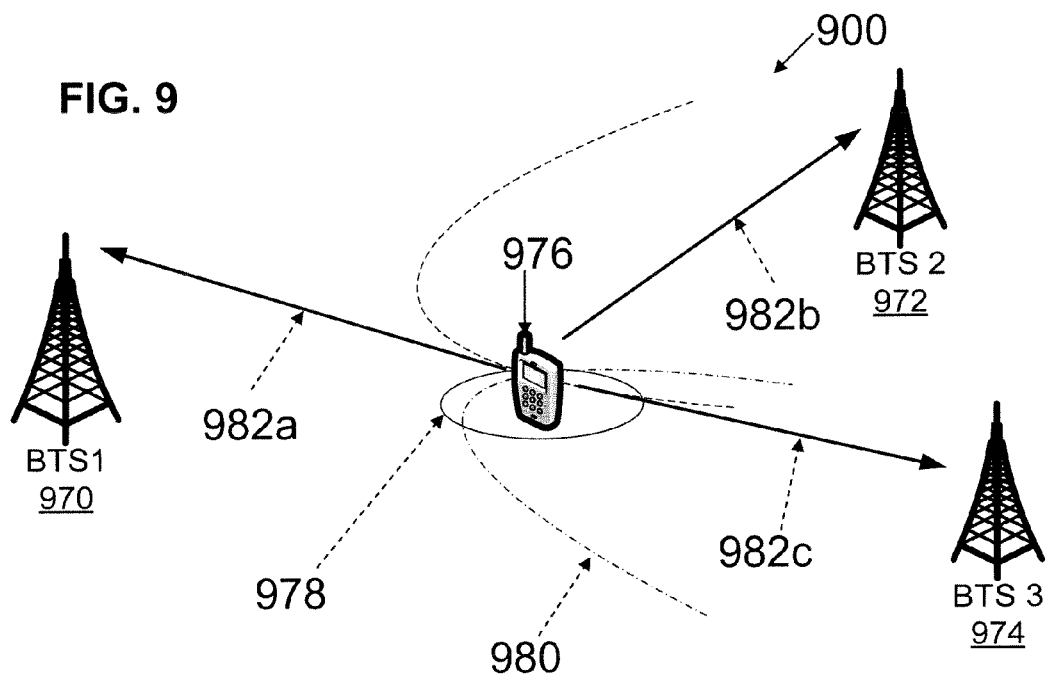
FIG. 9 shows a mobile communications system implementing a method for providing a location based service to an access terminal in accordance with one embodiment of the present invention.

FIG. 9 shows a mobile communications system implementing a method for providing a location based service to an access terminal in accordance with one embodiment of the present invention. As shown in FIG. 9, the mobile communication system 900 includes a first base transceiver station (BTS1) 970, a second base transceiver station (BTS2) 972, a third base transceiver station (BTS3) 974, an access terminal 976, and an access burst indicated by arrows 982a, 982b, and 982c. The access terminal 976 can be configured to use various access channel structures.

Figure 10:
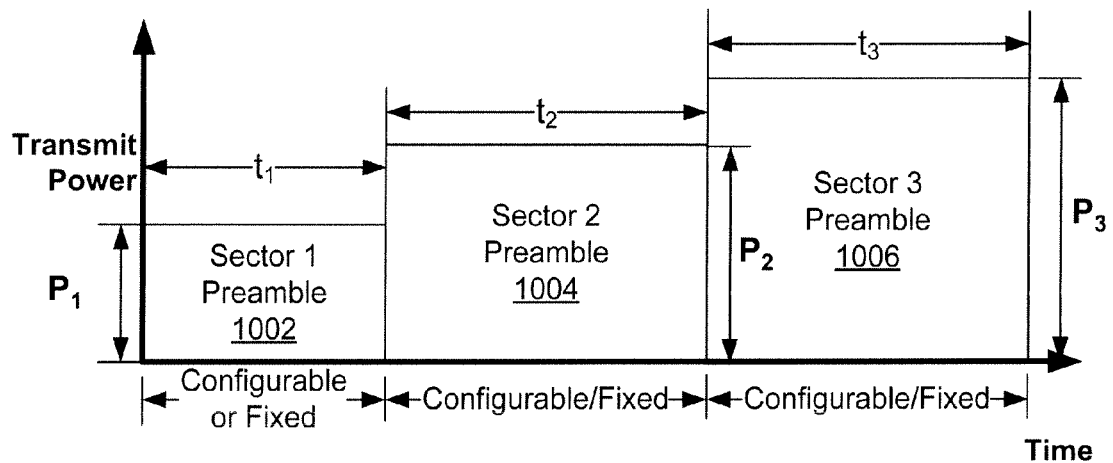
FIG. 10 shows a consecutive transmission of preamble only access probes in accordance with one embodiment of the present invention.

FIG. 10 shows a consecutive transmission of preamble only access probes in accordance with one embodiment of the present invention. As shown in FIG. 10, the access terminal 976 can be configured to transmit preamble only access probes having different transmit power levels and which are directed at various sectors or BTSs, such as BTS1 970, BTS2 972, and BTS3 974.

For example, preamble 1002 can be directed at sector 1 with a transmit power $P_1$, preamble 1004 can be directed at sector 2 with a transmit power $P_2$, and preamble 1006 can be directed at sector 3 with a transmit power $P_3$. As shown in FIG. 10, the relationship between the transmit powers of the preambles 1002, 1004, and 1006 can be expressed as: $P_1 < P_2 < P_3$.

Figure 11:
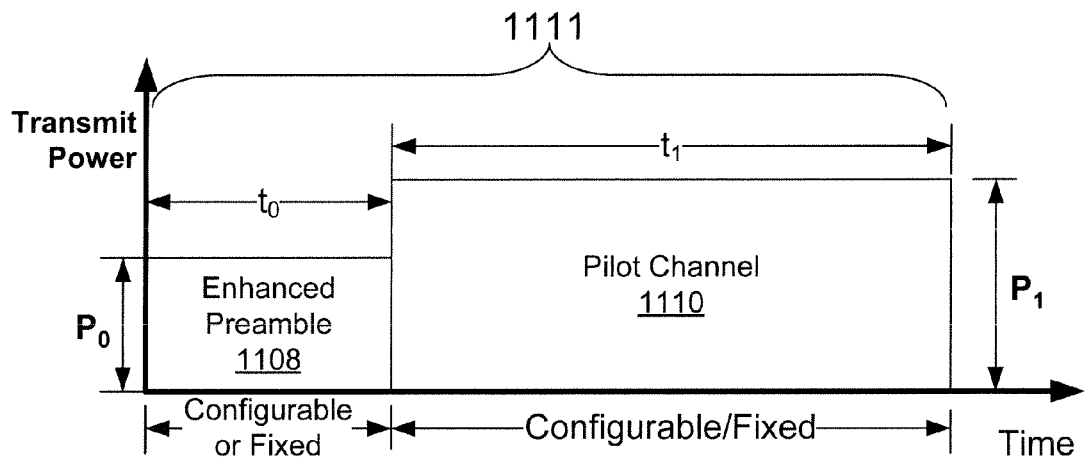
FIG. 11 shows an exemplary enhanced access probe in accordance with one embodiment of the present invention.

FIG. 11 shows an enhanced access probe 1111 in accordance with one embodiment of the present invention. As shown in FIG. 11, enhanced access probe 1111 includes an enhanced preamble 1108 and a pilot channel 1110. As further shown in FIG. 11, the access terminal 976 can be configured to transmit the enhanced preamble 1108 and to subsequently transmit the pilot channel 1110.

The access terminal 976 is configured to transmit un-modulated symbols with a binary value "0" on the pilot channel, such as pilot channel 1110. The pilot channel 1110 is configured to continuously transmit during transmission of the access channel. The pilot channel 1110 is transmitted on the "I" channel using the 16-chip Walsh function 0 cover.

Figure 12:
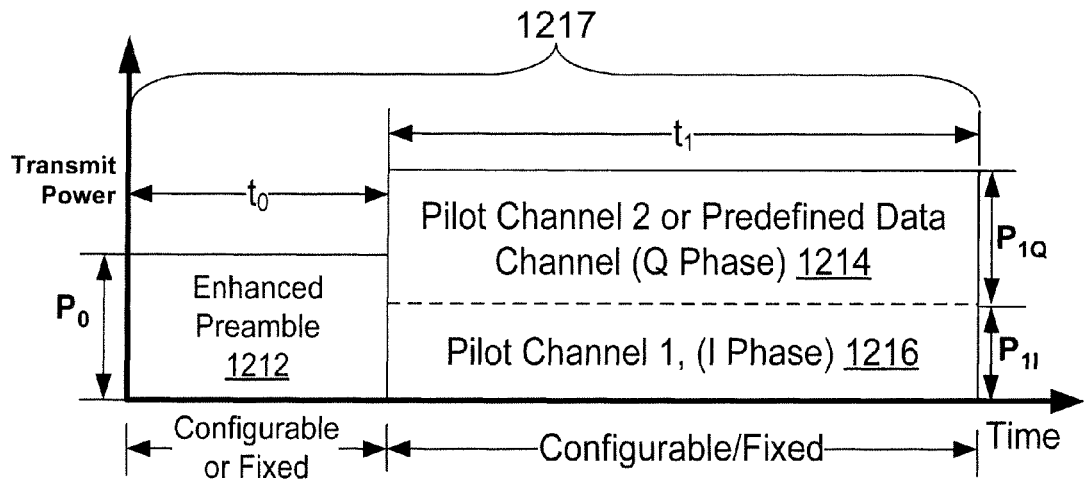
FIG. 12 shows an exemplary enhanced access probe in accordance with one embodiment of the present invention.

FIG. 12 shows an enhanced access probe 1217 in accordance with one embodiment of the present invention. As shown in FIG. 12, the enhanced access probe 1217 includes an enhanced preamble 1212, a pilot channel 11216, and a pilot channel 2 1214.

In one embodiment, the enhanced preamble 1212 is directed to BTS1 970, the pilot channel 11216 is directed to BTS1 970, and the pilot channel 2 1214 is directed to BTS2 972. In another embodiment, predefined data is transmitted in place of the pilot channel 2 1214. In one embodiment, the enhanced preamble 1212 is transmitted using a Walsh function that is different than the 16-chip Walsh function 0 in order to distinguish the enhanced preamble 1212 from conventional non-enhanced preambles.

In the enhanced access probe 1217 shown in FIG. 12, access channel physical layer packet data or a NULL access channel physical layer packet are not transmitted on the data channel during transmission of the enhanced access probe 1217. In a NULL access channel physical layer packet, the transmitted data is predefined. For example, the data in a NULL access channel physical layer packet may include all "0's." The data may be transmitted using either 4-chip Walsh function 2 or any other predefined Walsh function.

The enhanced preamble 1212 is transmitted either on the I phase or Q phase or a combination of the I phase and Q phase. In one embodiment, the enhanced preamble 1212 can be transmitted on the I phase for backward compatibility purposes. In another embodiment, the enhanced preamble 1212 can be transmitted on the Q phase for high detectability.

As shown in FIG. 12, the transmit power $P_0$ of the enhanced preamble 1212 is greater than the transmit power $P_{1I}$ of the pilot channel 1216. However, it should be understood that the transmit power $P_0$ of the preamble 1212 can be configured to have a greater or lesser transmit power. In one embodiment, the transmit power $P_0$ is equivalent to the output power used for transmitting data at 9.6 kbps in accordance with EV-DO standards.

The length of the enhanced access probe 1217 can be defined in frames by the "PreambleLength" field or in slots by the "PreambleLengthSlots" field in Tables 1 and 2. The length of the data on the pilot channels 1214 and 1216 can be defined by the "CapsuleLengthMax" field in Tables 1 and 2.

Figure 13:
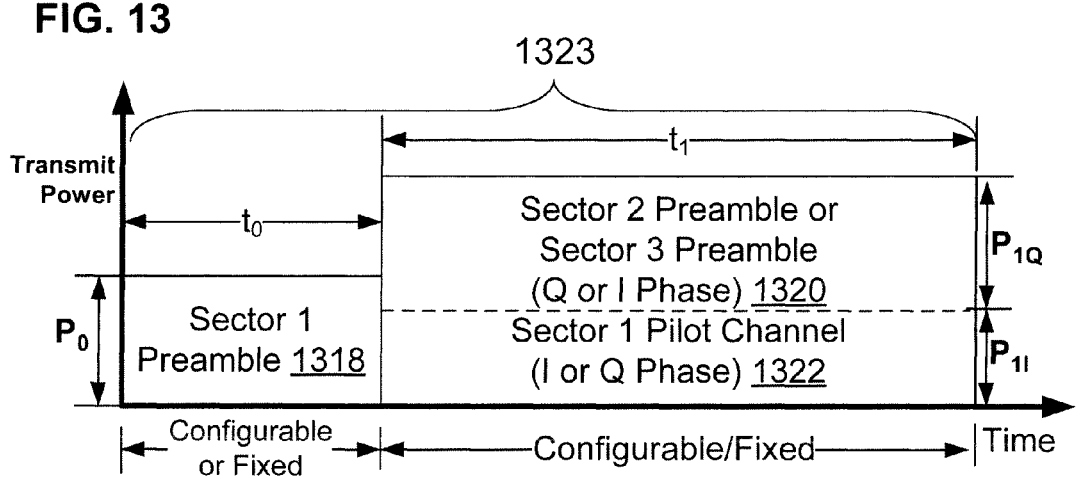
FIG. 13 shows an exemplary enhanced access probe in accordance with one embodiment of the present invention.

FIG. 13 shows an enhanced access probe 1323 in accordance with one embodiment of the present invention. As shown in FIG. 13, enhanced access probe 1323 includes a sector 1 preamble 1318, a preamble 1320 which can correspond to either sector 2 or sector 3, and a sector 1 pilot channel 1322.

The sector 1 preamble 1318 can be transmitted either on the I phase or the Q phase or a combination of the I phase and Q phase with transmit power $P_0$. Thereafter, preamble 1320 can be transmitted on the Q phase or the I phase with a transmit power $P_{1Q}$ and the sector 1 pilot channel 1322 can be transmitted on the I phase or Q phase with a transmit power $P_{1I}$.

Figure 14:
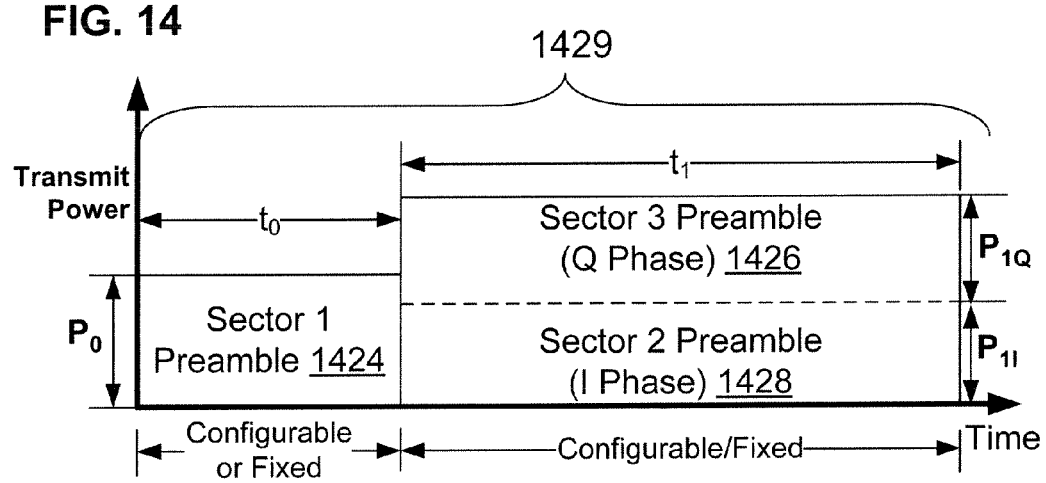
FIG. 14 shows an exemplary enhanced access probe in accordance with one embodiment of the present invention.

FIG. 14 shows an enhanced access probe 1429 in accordance with one embodiment of the present invention. As shown in FIG. 14, enhanced access probe 1429 includes a sector 1 preamble 1424, a sector 3 preamble 1426, and a sector 2 preamble 1428.

The sector 1 preamble 1424 can be transmitted on either the I phase or the Q phase or a combination of the I phase and Q phase with transmit power $P_0$. Thereafter, sector 3 preamble 1426 can be transmitted on the Q phase with a transmit power $P_{1Q}$ and the sector 2 preamble 1428 can be transmitted on the I phase with a transmit power $P_{1I}$.

Figure 15:
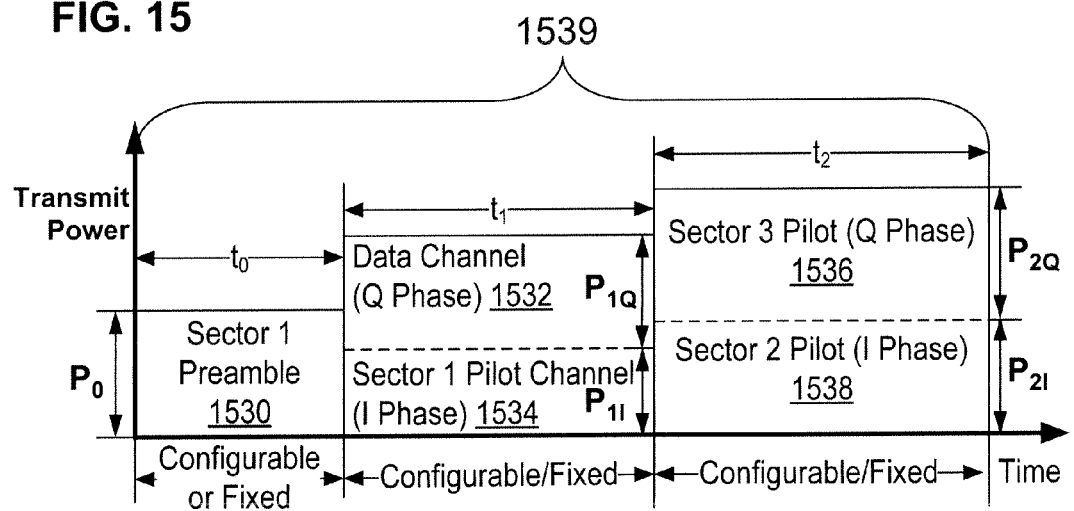
FIG. 15 shows an exemplary enhanced access probe in accordance with one embodiment of the present invention.

FIG. 15 shows an enhanced access probe 1539 in accordance with one embodiment of the present invention. As shown in FIG. 15, enhanced access probe 1539 includes a sector 1 preamble 1530, a data channel 1532, a sector 1 pilot channel 1534, a sector 3 pilot 1536, and a sector 2 pilot 1538.

The sector 1 preamble 1530 can be transmitted on either the I phase or the Q phase or a combination of the I phase and Q phase with transmit power $P_0$. The data channel 1532 can then be transmitted on the Q phase with a transmit power $P_{1Q}$ and the sector 1 pilot channel 1534 can be transmitted on the I phase with a transmit power $P_{1I}$. Thereafter, the sector 3 pilot 1536 can be transmitted on the Q phase with a transmit power $P_{2Q}$ and the sector 2 pilot 1538 can be transmitted on the I phase with a transmit power $P_{2I}$. As shown in FIG. 15, the transmit power $P_{2Q}$ and the transmit power $P_{2I}$ are each greater than transmit power $P_{1I}$.

Figure 16:
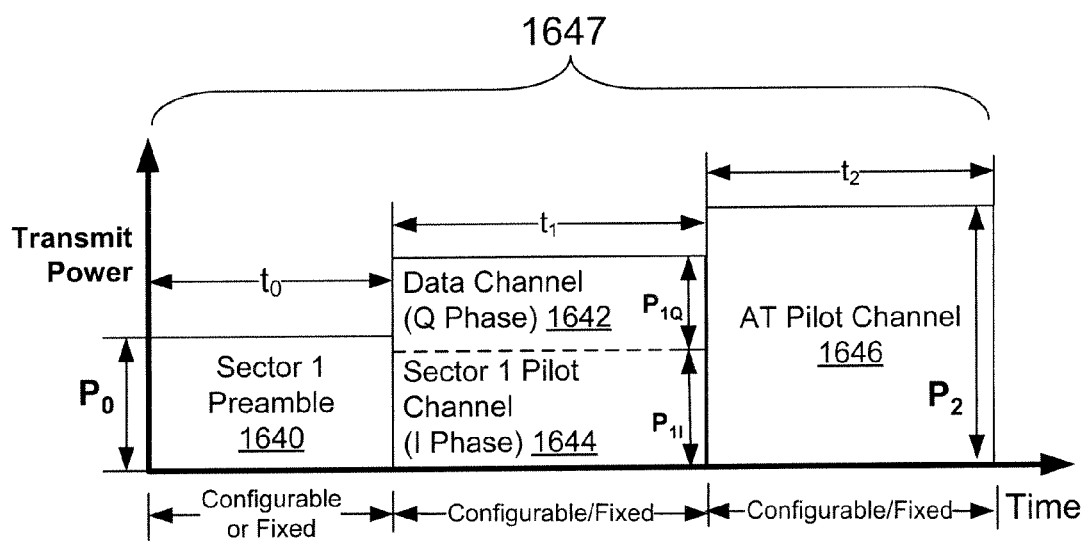
FIG. 16 shows an exemplary enhanced access probe in accordance with one embodiment of the present invention.

FIG. 16 shows an enhanced access probe 1647 in accordance with one embodiment of the present invention. As shown in FIG. 16, enhanced access probe 1647 includes a sector 1 preamble 1640, a data channel 1642, a sector 1 pilot channel 1644, and an access terminal specific pilot channel 1646.

The sector 1 preamble 1640 can be transmitted on either the I phase or the Q phase or a combination of the I phase and Q phase with transmit power $P_0$. The data channel 1642 can then be transmitted on the Q phase with a transmit power $P_{1Q}$ and the sector 1 pilot channel 1644 can be transmitted on the I phase with a transmit power $P_{1I}$. Thereafter, the access terminal specific pilot channel 1646 can be transmitted with a transmit power $P_2$.

Figure 17:
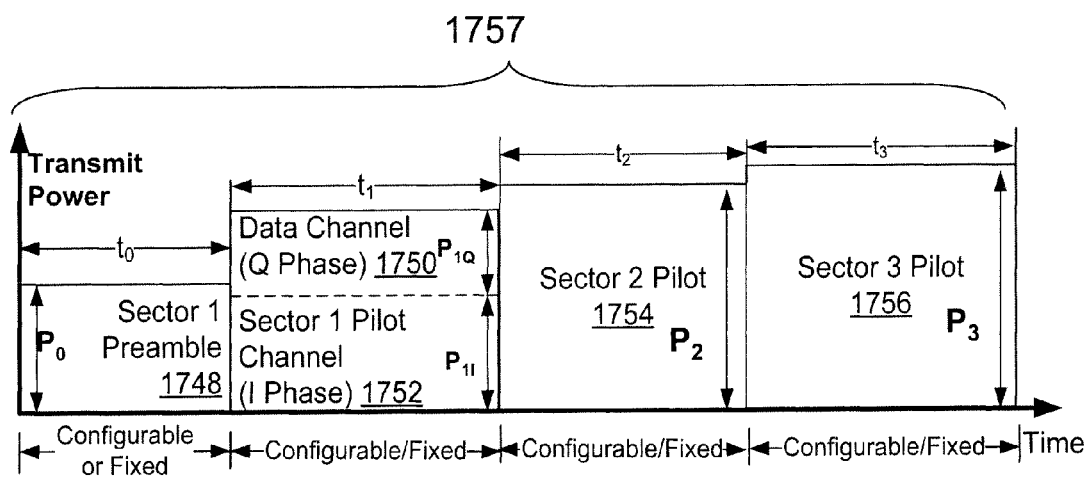
FIG. 17 shows an exemplary enhanced access probe in accordance with one embodiment of the present invention.

FIG. 17 shows an enhanced access probe 1757 in accordance with one embodiment of the present invention. As shown in FIG. 17, enhanced access probe 1757 includes a sector 1 preamble 1748, a data channel 1750, a sector 1 pilot channel 1752, a sector 2 pilot 1754, and a sector 3 pilot 1756.

The sector 1 preamble 1748 can be transmitted on either the I phase or the Q phase or a combination of the I phase and Q phase with transmit power $P_0$. The data channel 1750 can then be transmitted on the Q phase with a transmit power $P_{1Q}$ and the sector 1 pilot channel 1752 can be transmitted on the I phase with a transmit power $P_{1I}$. Thereafter, the sector 2 pilot 1754 can be transmitted with a transmit power $P_2$, followed by the sector 3 pilot 1756 which can be transmitted with a transmit power $P_3$.

Figure 18:
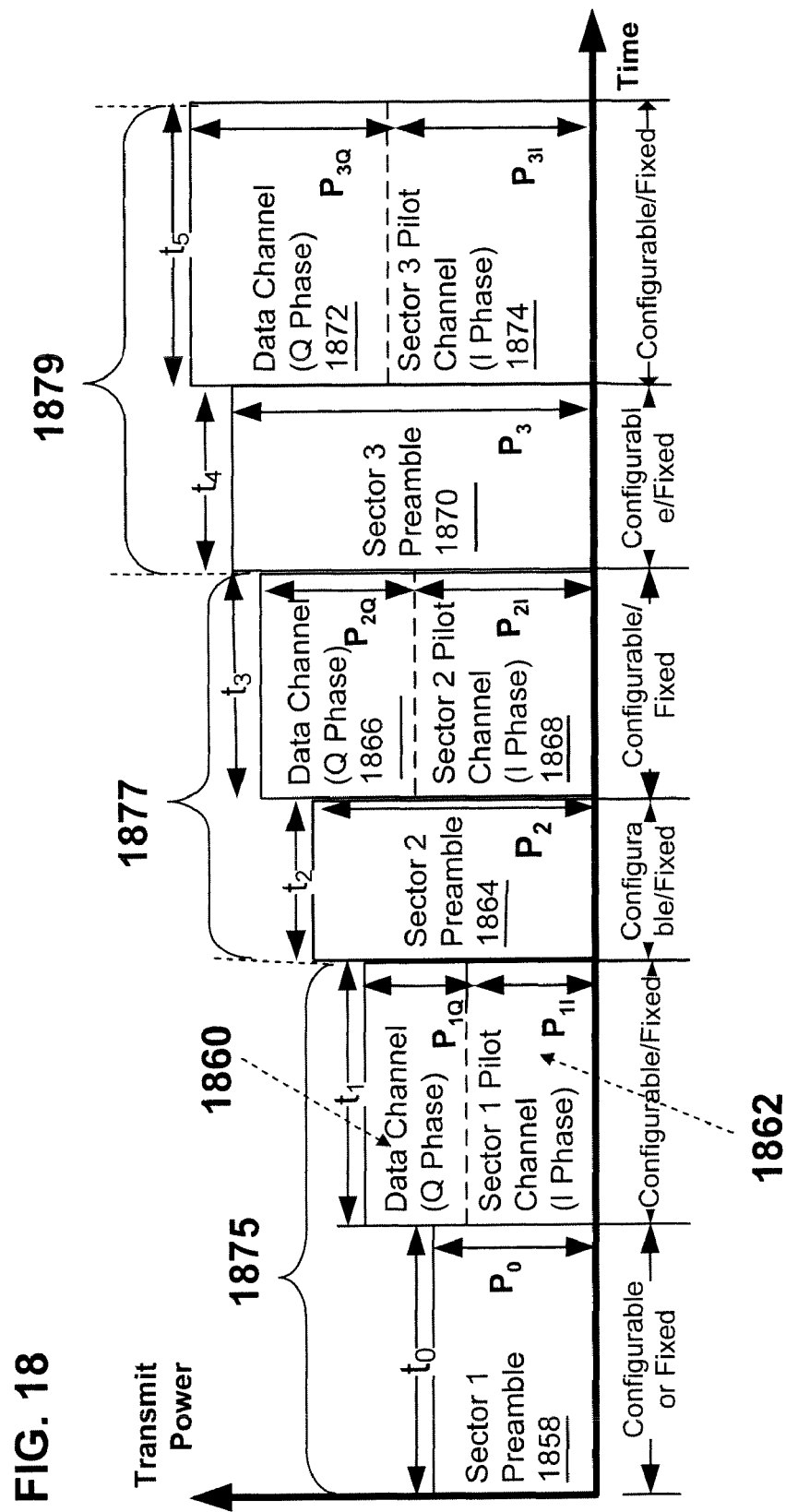
FIG. 18 shows a consecutive transmission of enhanced access probes in accordance with one embodiment of the present invention.

FIG. 18 shows access probes 1875, 1877, and 1879 being consecutively transmitted in accordance with one embodiment of the present invention. As shown in FIG. 18, access probe 1875 includes a sector 1 preamble 1858, a data channel 1860, and a sector 1 pilot channel 1862. As also shown in FIG. 18, access probe 1877 includes a sector 2 preamble 1864, a data channel 1866, and a sector 2 pilot channel 1868. As further shown in FIG. 18, access probe 1879 includes a sector 3 preamble 1870, a data channel 1872, and a sector 3 pilot channel 1874.

The sector 1 preamble 1858 can be transmitted on either the I phase or the Q phase or a combination of the I phase and Q phase with transmit power $P_0$. The data channel 1860 can then be transmitted on the Q phase with a transmit power $P_{1Q}$ and the sector 1 pilot channel 1862 can be transmitted on the I phase with a transmit power $P_{1I}$.

The sector 2 preamble 1864 can be transmitted on either the I phase or the Q phase or a combination of the I phase and Q phase with transmit power $P_2$. The data channel 1866 can then be transmitted on the Q phase with a transmit power $P_{2Q}$ and the sector 2 pilot channel 1868 can be transmitted on the I phase with a transmit power $P_{2I}$.

The sector 3 preamble 1870 can be transmitted on either the I phase or the Q phase or a combination of the I phase and Q phase with transmit power $P_3$. The data channel 1872 can then be transmitted on the Q phase with a transmit power $P_{3Q}$ and the sector 3 pilot channel 1874 can be transmitted on the I phase with a transmit power $P_{3I}$.

The present invention uses the access channel of a mobile communication system, such as mobile communication system 900 in FIG. 9, to transmit access probes during an idle mode of an access terminal, such as access terminal 976, for determining the position of the access terminal. The access probes can be transmitted in an access burst, such as the access burst indicated by lines 982a, 982b, and 982c in FIG. 9. As a result, the present invention avoids using the traffic channel for determining the position of the access terminal.

Typically, an access terminal sends an access probe based on the access cycle of the access channel, which is generally followed by a transmission of at least two additional access probes based on the access channel of a neighboring cell within a predefined delay. Since the duration of the access cycle is short, trilateration can be performed with acceptable accuracy.

An access terminal typically detects multiple pilots from multiple BTSs, which can include the serving BTS and neighboring BTSs. Once the positioning service is requested by the access terminal or by the network, an access probe will be requested from the access terminal for determining its position. The access terminal can then transmit at least three access probes to multiple BTSs with a predefined delay, where each access probe is transmitted via a different access channel and scrambling.

Access probes including the same information, but with different scrambling can be transmitted at least three times to different BTSs based on their access cycle offsets. The BTSs can then measure the strength and the time of arrival of the received access probes.

For example, the BTSs can transmit the measured values to the location server, in addition to other information, such as the various time offsets of the access channel cycle. It should be understood that synchronization between the BTSs can be maintained as long as the access network or location server is provided with the time offset information corresponding to the access channel cycle of each BTS.

The measured time of arrival at each BTS will typically include various delays, such as the time offset corresponding to the access channel cycle of each BTS and propagation delays due to the distance traveled of each transmission. However, since the time offsets are provided to the access network or the location server, and since the propagation delay of each transmission can be calculated by subtracting the time offset from the measured time of arrival, the aforementioned delays can be compensated.

After the location server determines the position of the target access terminal, the location server can send an acknowledgement to the BTSs and the access terminal. Even if the access terminal is not acknowledged by one BTS, the access terminal must repeat the multiple access probe transmissions described above.

The transmit power used for each access probe transmission, however, is varied with respect to different BTSs. For example, an access terminal can be configured to transmit access probes using the same transmit power to communicate with a base station that acknowledged the access probe transmission, whereas an increased transmit power is used to transmit access probes to a base station that failed to acknowledge the access probe.

Figure 19:
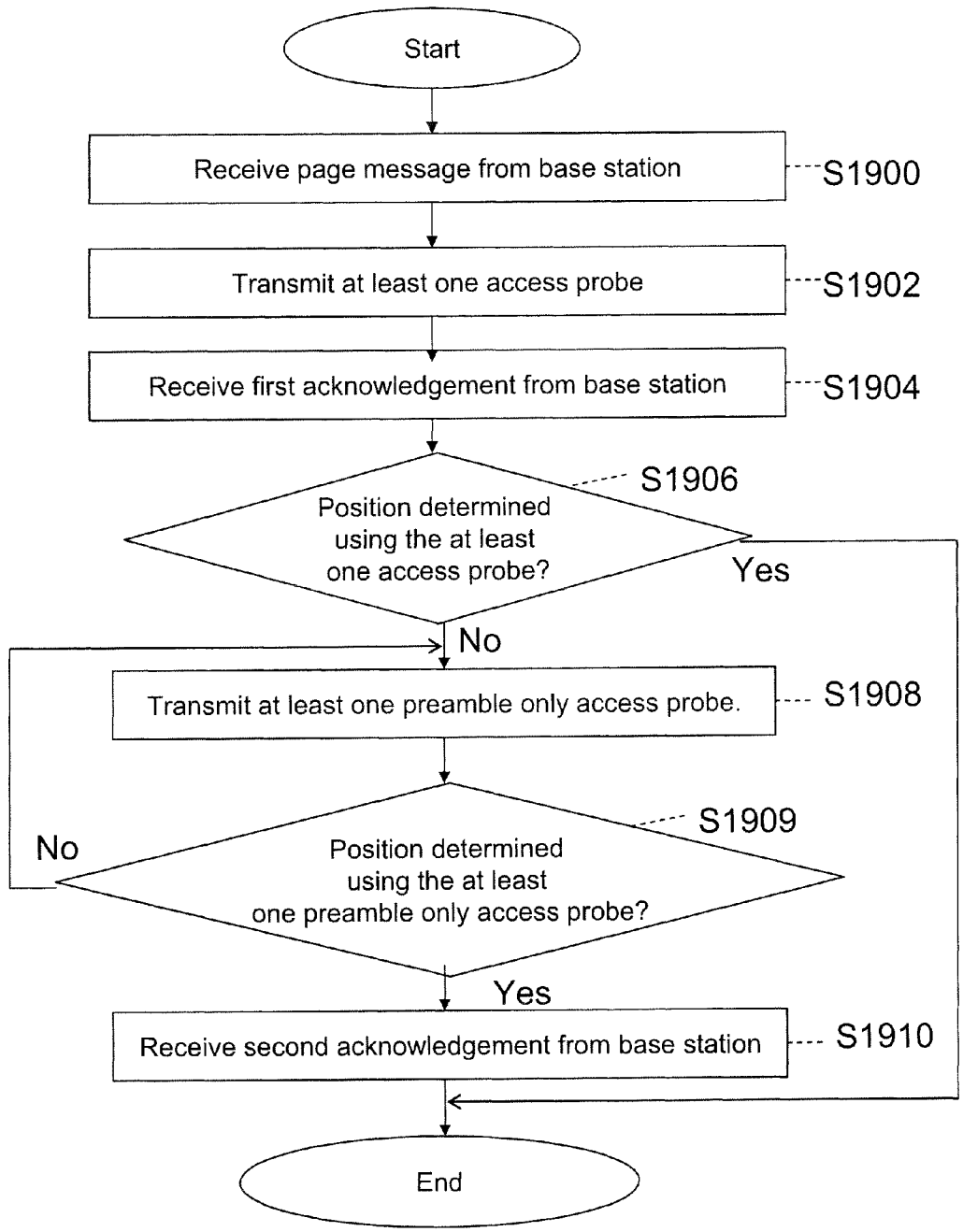
FIG. 19 is a flowchart illustrating a method for providing a location based service to an access terminal is a mobile communication system in accordance with one embodiment of the present invention.

FIG. 19 is a flowchart illustrating a method for providing a location based service to an access terminal is a mobile communication system in accordance with one embodiment of the present invention. With reference to FIG. 9, a page message is received by the access terminal 976 from at least one base station, such as BTS1 970, BTS2 972, and BTS3 974 (S1900). After receiving the at least one page message, the access terminal 976 transmits at least one access probe. For example, the data capsule of the at least one access probe may include a pilot signal measurement message (PSMM) and a route update message (RUM), in addition to a media access control (MAC) header.

After the at least one access probe is received, the access terminal 976 receives a first acknowledgement from the serving base station (S1904) and determines if the position of the access terminal 976 has been determined (S1906).

If the position of the access terminal 976 has been determined using the at least one access probe with the requisite perceived quality of service (PQoS), then the method is ended. However, if the position of the access terminal 976 has not been determined, then the access terminal 976 transmits at least one preamble only access probe (S1908), such as sector 1 preamble 1002, sector 2 preamble 1004, and/or sector 3 preamble 1006 in FIG. 10, in response to a command provided in the first acknowledgement via the extended access parameters for continuing the method. For example, the access terminal 976 can further provide the access probe offset value to the BTSs via the "AccessOffsetEx" field and additional PQoS associated parameters, such as duration and periodicity.

For example, the BTSs and LMUs can measure timing information, such as the time of arrival information of the at least one preamble only access probe, and can provide the timing information to a position determining entity (PDE). It is then determined if the position of the access terminal 976 has been determined (S1909).

If the PDE has received an appropriate amount of timing information and the requisite PQoS has been satisfied, the position of the access terminal 976 can be determined and the access terminal 976 thereafter receives a second acknowledgement message from the BTS (S1910). Otherwise, the access terminal 976 continues to transmit at least one preamble only access probe (S1909) and determine if the position of the access terminal 976 has been determined (S1908).

In another embodiment, after a page message is received by the access terminal 976 from at least one base station (S1900), the access terminal 976 can be configured to transmit at least three consecutive access probes to multiple BTSs at approximately the same time. Each of the at least three access probes is transmitted using a different access channel and scrambling.

It should be understood that synchronization between the BTSs can be maintained as long as the access network or location server is provided the time offset information corresponding to the access channel cycle of each BTS. Therefore, access probes including the same information but using different scrambling techniques can be transmitted at least three times to various BTSs based on their access cycle offsets.

Each of the BTSs and LMUs can measure the strength and various timing information of the received access probes in the same manner described above and can provide the timing information and the access cycle offsets corresponding to each BTS to a position determining entity (PDE). After a PDE has received an appropriate amount of timing information and the requisite PQoS has been satisfied, the position of the access terminal 976 can be determined.

Preferably, in order to achieve optimal results when performing the method shown in FIG. 19, the access probes of the present invention, such as the extended access probe 862 show in FIG. 8, are optimized. A technique for optimizing the extended access probe 862 includes minimizing the content in the data payload of the extended access probe 862.

For example, in applications where the extended access probe 862 is used for determining the position of an access terminal, and when the target access terminal transmits an access probe to the serving BTS, the access terminal may use the scrambling pseudo noise (PN) code corresponding to the serving BTS. The data payload, however, may include all or some of the following fields: "PayloadLength," "ATIType," "ATI," "NumReferences," "ReferencePN," "ReferenceChannel," and "FCS."

The "PayloadLength" field indicates the length of the data payload. The "ATIType" field indicates either a Random Access Terminal Identifier (RATI) or a Unicast Access Terminal Identifier (UATI). The "ATI" field indicates the identity number of the access terminal. The "NumReferences" field indicates the number of strong pilots detected by the access terminal. The "NumReferences" field can indicate the size of the active pilot set or other pilot set for purposes of determining the position of the access terminal. "ReferencePN" is the PN Offset of each reference PN in units of 64 PN chips. "ReferenceChannel" is the reference channel record specifying the type of network and frequency.

The serving BTS can analyze the access payload to determine the reference BTSs that can be detected by the access terminal. Therefore, since multiple reference BTSs can be detected by the access terminal, a more accurate determination of the position of the access terminal can be made by averaging the positions determined via each reference BTS. Such a technique can provide improved results over the traditional Cell ID approach, where only the serving BTS is the reference BTS.

The enhanced access probes and techniques according to the present invention, such as the preamble only access probe, the extended access probe offset, and the extended enhanced access parameter message, enable reverse link LCS positioning techniques which provide EV-DO compatibility with minimal impact on the air interface. Furthermore, by utilizing the higher signal processing capability provided by the network, the invention reduces access terminal complexity and improves the efficiency of the access terminal.

Depending on the type of implementation, it is possible that the present invention can take the form of an entirely hardware embodiment, an entirely software embodiment or an embodiment containing both hardware and software elements. A software embodiment may include, but not be limited to, firmware, resident software, microcode, etc.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

What is claimed is:

1. A method of providing a location based service to an access terminal in a mobile communication system, the method comprising:

transmitting one or more access probes, each of the one or more access probes comprising a preamble having a first specific length and transmitted at a first power level, wherein the preamble is utilized to determine a position of the access terminal; and transmitting one or more additional access probes, at least one of the one or more additional access probes having a second specific length and transmitted at a second power level, wherein transmitting the one or more additional access probes comprises:

transmitting a first of the one or more additional access probes having the second specific length at the second power level; and transmitting a second of the one or more additional access probes having a third specific length at a third power level, wherein at least the second specific length and the third specific length are different or the second power level and the third power level are different.

2. The method of claim 1, further comprising receiving at least one access parameter defining at least the first specific length or the first power level.

3. The method of claim 2, wherein the at least first specific length or first power level are defined according to at least one intended recipient.

4. The method of claim 2, wherein the at least one access parameter further indicates at least one access offset value and transmitting the one or more access probes comprises delaying the transmission according to the at least one access offset value.

5. The method of claim 1, further comprising:
receiving an acknowledgment of the receipt of the one or more access probes from at least one intended recipient, the acknowledgment comprising an indication of a preamble-only access mode.

6. The method of claim 1, further comprising receiving at least one access parameter defining at least the second specific length or the second power level.

7. The method of claim 6, wherein the at least one access parameter indicates at least one access offset value and transmitting the one or more additional access probes comprises delaying the transmission according to the at least one access offset value.

8. The method of claim 5, wherein:
the second specific length and the second power level are set according to a strength of a signal received from a first of the at least one intended recipient; and
the third specific length and the third power level are set according to a strength of a signal received from a second of the at least one intended recipient.

9. The method of claim 1, wherein transmitting the one or more additional access probes further comprises:
transmitting the first of the one or more additional access probes according to a first offset; and
transmitting the second of the one or more additional access according to a second offset,
wherein the first offset and the second offset are different.

10. The method of claim 1, wherein the second power level and the first power level are the same.

11. The method of claim 1, wherein the second power level and the first power level are different.

12. The method of claim 1, wherein the second specific length and the first specific length are the same.

13. The method of claim 1, wherein the second specific length and the first specific length are different.

14. The method of claim 1, wherein each of the one or more additional access probes comprises only a preamble.

15. The method of claim 14, further comprising receiving at least one access parameter defining at least the second specific length or the second power level.

16. The method of claim 15, wherein the at least one access parameter indicates at least one access offset value and transmitting the one or more additional access probes comprises delaying the transmission according to the at least one access offset value.

17. The method of claim 14, wherein:
the second specific length and the second power level are set according to a strength of a signal received from a first intended recipient; and
the third specific length and the third power level are set according to a strength of a signal received from a second intended recipient.

18. The method of claim 14, wherein transmitting the one or more additional access probes further comprises:
transmitting the first of the one or more additional access probes according to a first offset; and
transmitting the second of the one or more additional access according to a second offset, wherein the first offset and the second offset are different.

19. The method of claim 14, wherein the second power level and the first power level are the same.

20. The method of claim 14, wherein the second power level and the first power level are different.

21. The method of claim 14, wherein the second specific length and the first specific length are the same.

22. The method of claim 1, wherein the one or more access probes are transmitted upon receiving a paging message from a network.

23. The method of claim 1, wherein each of the one or more access probes further comprises data having a fourth specific length and transmitted at a fourth power level.

24. The method of claim 23, wherein the first specific length and fourth specific length are determined according to at least one intended recipient.

25. The method of claim 23, wherein the first power level and the fourth power level are determined according to at least one intended recipient.

26. The method of claim 1, wherein each of the one or more access probes comprises only a preamble.

27. A method of providing a location based service to an access terminal in a mobile communication system, the method comprising:
receiving one or more access probes from the access terminal, each of the one or more access probes comprising a preamble having a first specific length and transmitted at a first power level;
receiving one or more additional access probes, each of the one or more additional access probes having a second specific length and transmitted at a second power level; and
utilizing the preamble to determine a position of the access terminal,
wherein at least a specific length of a first of the one or more additional access probes is different than a specific length of a second of the one or more additional access probes or a power level of the first of the one or more additional access probes is different than a power level of the second of the one or more additional access probes.

28. The method of claim 27, further comprising transmitting at least one access parameter defining at least the first specific length or the first power level.

29. The method of claim 28, wherein the at least first specific length or first power level are defined according to at least one intended recipient of the one or more access probes.

30. The method of claim 28, wherein the at least one access parameter further indicates at least one access offset value for transmitting the one or more additional access probes.

31. The method of claim 27, further comprising:
transmitting an acknowledgment of the receipt of the one or more access probes.

32. The method of claim 27, further comprising transmitting at least one access parameter defining at least the second specific length or the second power level.

33. The method of claim 32, wherein the at least one access parameter indicates at least one access offset value for transmitting the one or more additional access probes.

34. The method of claim 27, wherein the second power level and the first power level are the same.

35. The method of claim 27, wherein the second power level and the first power level are different.

36. The method of claim 27, wherein the second specific length and the first specific length are the same.

37. The method of claim 27, wherein the second specific length and the first specific length are different.

38. The method of claim 27, wherein each of the one or more additional access probes comprises only a preamble.

39. The method of claim 38, further comprising transmitting at least one access parameter defining at least the second specific length or the second power level.

40. The method of claim 39, wherein the at least one access parameter indicates at least one access offset value for transmitting the one or more additional access probes.

41. The method of claim 38, wherein the second power level and the first power level are the same.

42. The method of claim 38, wherein the second power level and the first power level are different.

43. The method of claim 38, wherein the second specific length and the first specific length are the same.

44. The method of claim 38, wherein the second specific length and the first specific length are different.

45. The method of claim 27, wherein each of the one or more access probes further comprises data having a third specific length and transmitted at a third power level.

46. The method of claim 27, wherein each of the one or more access probes comprises only a preamble.

* * * * *